United States Patent [19]

Pfarrer et al.

[11] 3,978,382
[45] Aug. 31, 1976

[54] CONTROL APPARATUS FOR TWO-SPEED, SINGLE PHASE COMPRESSOR

[75] Inventors: David M. Pfarrer, Hurst; Sidney A. Parker, Fort Worth, both of Tex.

[73] Assignee: Lennox Industries Inc., Marshalltown, Iowa

[22] Filed: Dec. 16, 1974

[21] Appl. No.: 532,884

[52] U.S. Cl............................ 318/221 R; 318/224 A; 318/225 R; 318/33 D; 317/13 B; 317/13 C
[51] Int. Cl.².................................................. H02P 1/44
[58] Field of Search........ 318/221 R, 221 H, 224 R, 318/224 A, 225 R, 334; 317/13

[56] References Cited
UNITED STATES PATENTS

| | | | |
|---|---|---|---|
| 1,859,369 | 5/1932 | Kennedy | 318/224 A |
| 3,049,654 | 8/1962 | Brucken | 318/225 R |
| 3,049,655 | 8/1962 | Long et al. | 318/334 X |
| 3,305,715 | 2/1967 | Stenger | 318/221 R |

*Primary Examiner*—Gene Z. Rubinson
*Attorney, Agent, or Firm*—Allegretti, Newitt, Witcoff & McAndrews

[57] ABSTRACT

The disclosure describes a refrigerant compressor of the type driven by a single phase motor capable of operating at a low speed and a high speed, the motor including a run winding, a 2-pole start winding and a 4-pole start winding. First and second temperature sensors are located adjacent the windings for detecting any change in temperature of the windings. A current transformer is used in combination with the temperature sensors to protect the motor windings. If the temperature or current conduction of any of the windings exceeds a predetermined value, a control device operates a switch in a pilot circuit that turns off the motor before damage from excessive heat or current can occur. A unique contactor assembly utilizing both electrical and mechanical interlocks interconnects the windings to provide two speed operation.

10 Claims, 9 Drawing Figures

3,978,382

CONTROL APPARATUS FOR TWO-SPEED, SINGLE PHASE COMPRESSOR

BACKGROUND AND SUMMARY OF THE INVENTION

This invention relates to refrigerant compressors driven by an electrical motor, and more particularly relates to means for controlling a refrigerant compressor utilizing a two-speed, single phase electrical motor.

Refrigerant compressors utilizing a two-speed compressor motor have been devised in the past. One such arrangement is shown in U.S. Pat. No. 3,584,980 (Cawley et al — June 15, 1971). Another is described in the applicants' U.S. application Ser. No. 436,179 entitled "Control Apparatus for Two-Speed Compressor", filed Jan. 24, 1974. Although a two speed compressor results in improved performance, the applicants have discovered that such an arrangement requires precise control in order to prevent damage to the compressor motor during two speed operation.

Compressor motors adapted to operate from a single phase source of electrical power generally comprise a number of windings. The applicants have found that each of these windings must be protected from thermal damage in order to ensure long motor life. Since thermal damage can occur rapidly under certain adverse operating conditions, the windings must be protected by sensitive temperature detectors capable of rapid response.

Although one temperature sensor placed adjacent to one of the windings will tend to provide protection against thermal destruction due to a locked rotor or running overload, a single sensor will not give adequate protection under all operating conditions. The applicants have discovered that protection is enhanced by providing a dual sensor for the windings in the motor. These sensors provide an indication of the temperature adjacent each winding. A current transformer is used in combination with the dual temperature sensors to protect the windings. If one of the sensors indicates an abnormally high temperature in an associated winding, or if the current sensing device or current transformer senses an abnormally high input current, control means operate a switch in a motor pilot circuit in order to remove all electrical power from the motor. In this manner, the apparatus provides complete overload protection.

Accordingly, it is an object of the present invention to provide a hermetic refrigerant compressor in which a motor adapted to operate on single phase electrical power has temperature sensors located adjacent the motor windings, so that each winding in the motor is adequately protected against thermal damage.

It is still another object of the invention to provide control apparatus of the foregoing type in combination with current sensing means for sensing abnormally high current conduction in any motor windings.

It is still another object of the invention to provide control apparatus of the foregoing type, in which a control device interrupts power to the motor if any one of the sensors detects an abnormally high temperature or high current in any of the motor windings.

The applicants have also discovered that the control of a two-speed compressor motor requires careful design of the contactors used to switch from a high speed mode of operation to a low speed mode of operation and vice versa. In a compressor motor adapted to be operated from single phase electrical power, multiple windings are frequently provided and must be interconnected in different ways in order to achieve different speeds of operation. The applicants have invented a unique system of electrically and mechanically interlocking the contactors required for two-speed operation in order to assure a failsafe system of operation.

It is still another object of the present invention to provide motor control apparatus of the foregoing type in which both mechanical and electrical interlocks are operated by and simultaneously with the contactors controlling the two-speed operation of the motor.

DESCRIPTION OF THE DRAWINGS

These and other objects, advantages and features of the present invention will hereafter appear in connection with the accompanying drawings wherein.

DESCRIPTION OF THE PREFERRED EMBODIMENT

Figure 1:
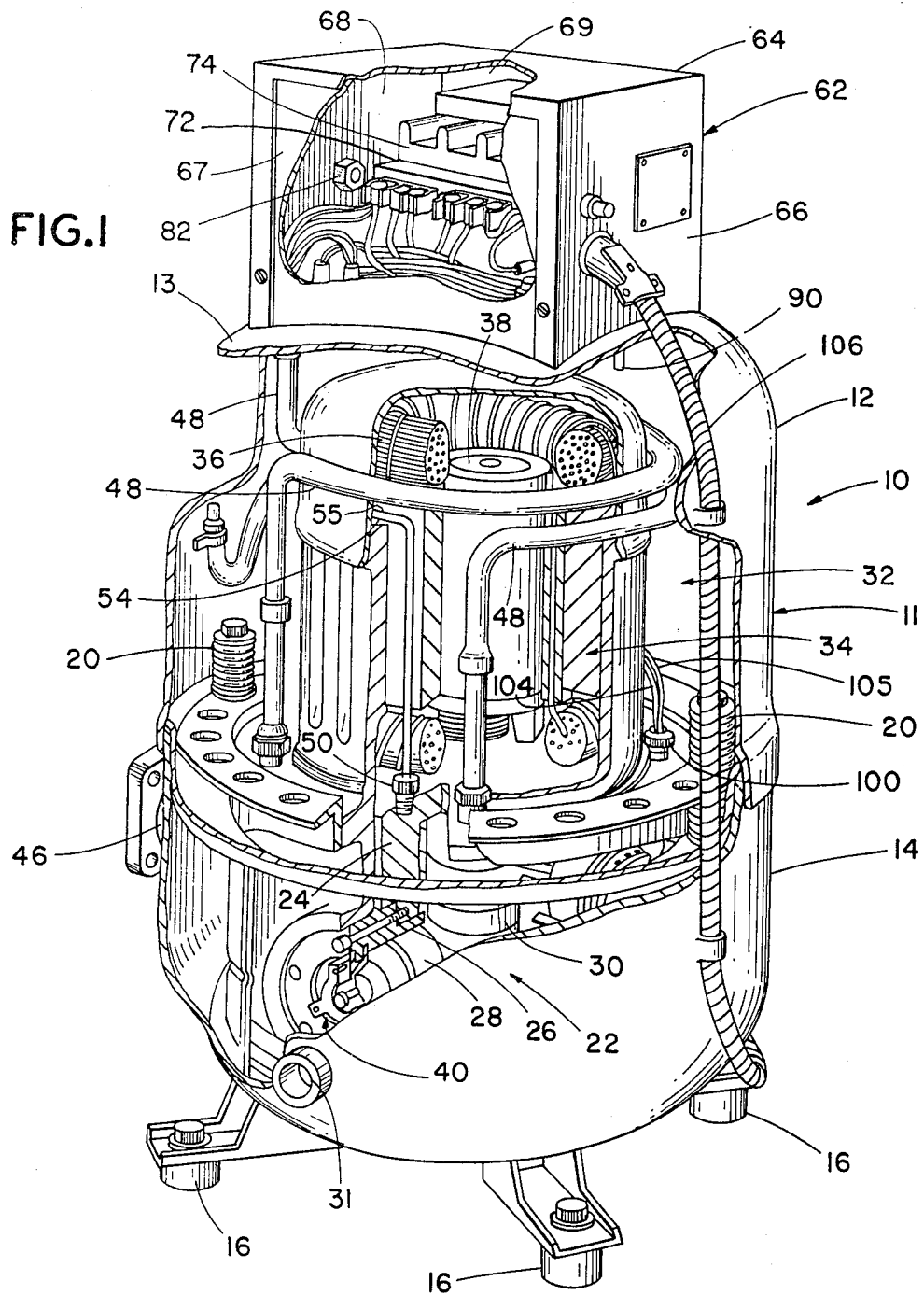
FIG. 1 is an isometric, fragmentary, partially cross-sectional view of a refrigerant compressor and motor embodying control apparatus made in accordance with the present invention.

Referring to FIG. 1, there is illustrated a refrigerant compressor 10 embodying a preferred form of the present invention. Compressor 10 comprises a sealed outer casing 11 which includes an upper shell 12 (having a top surface 13) that is welded to a lower shell 14. A plurality of legs 16 suitably secured to compressor 10 to support it in an upright position.

Resiliently supported within the outer casing by resilient coil spring means 20 is a compression mechanism 22. The compression mechanism comprises a compessor block 24 which defines a cylinder 26, together with additional cylinders (not shown). A movable piston 28 reciprocates within cylinder 26 in order to compress a refrigerant vapor. Additional pistons, like piston 28, reciprocate in the additional cylinders, not shown. Each of the pistons is driven from a vertically-disposed drive shaft 30. The lower portion of the outer casing forms an oil sump in which the oil level is visible through an oil sight glass 31.

An electrical motor 32 is used to drive compression mechanism 22. The motor comprises a stator 34 which includes windings 36. A rotatable rotor 38 is inductively coupled to stator 34 and is mechanically coupled to drive shaft 30.

Provided at the end of each cylinder, including cylinder 26, and closing the end of each cylinder cavity, is a valve assembly such as a valve assembly 40. The valve assembly includes a discharge valve and a suction valve. The suction valve opens on the suction stroke of piston 28 to permit refrigerant gas (suction gas) to enter cylinder 26 through a suction line 46. On the compression stroke of piston 28, the suction valve closes and the discharge valve opens to permit the flow of compressed refrigerant gas to a discharge muffler in the compression mechanism and then to discharge line 48. The compressed gas is transmitted through the discharge line to a conventional condenser or heat exchanger (not shown).

A thermal density sensor 50 is located inside outer casing 11. The sensor comprises a thermostat which is screwed into compressor block 24 in the position shown in FIG. 1. The thermostat is preferably the same type of temperature limiting device shown in U.S. Pat. No. 3,278,111 (Parker — Oct. 11, 1966) in which switch contacts 58 (FIG. 2) and a temperature responsive element are contained within a single housing. Sensor 50 is set to open electrical contact 58 at about 22°F., plus or minus 3°F., and to close contacts 58 at about 32°F., plus or minus 3°F. Contacts 58 are electrically connected to sensor 50 by conductors 54 and 55. Sensor 50 prevents the start up of motor 32 when the temperature of the running parts of the compression mechanism is below a predetermined value which inhibits adequate lubrication.

As shown in FIG. 1, a control box assembly 62, which comprises a top 64 and sidewalls 66–69, is physically coupled to top surface 13 of outer casing 11. An electrical control assembly 72, contained within control box 62, includes a contactor 74, as well as compressor terminals.

Control assembly 72 also comprises a high pressure switch assembly 82 located in the discharge gas spud on the exterior of the outer casing. Switch contacts 84 (FIG. 2) are contained within assembly 82.

Figure 2:
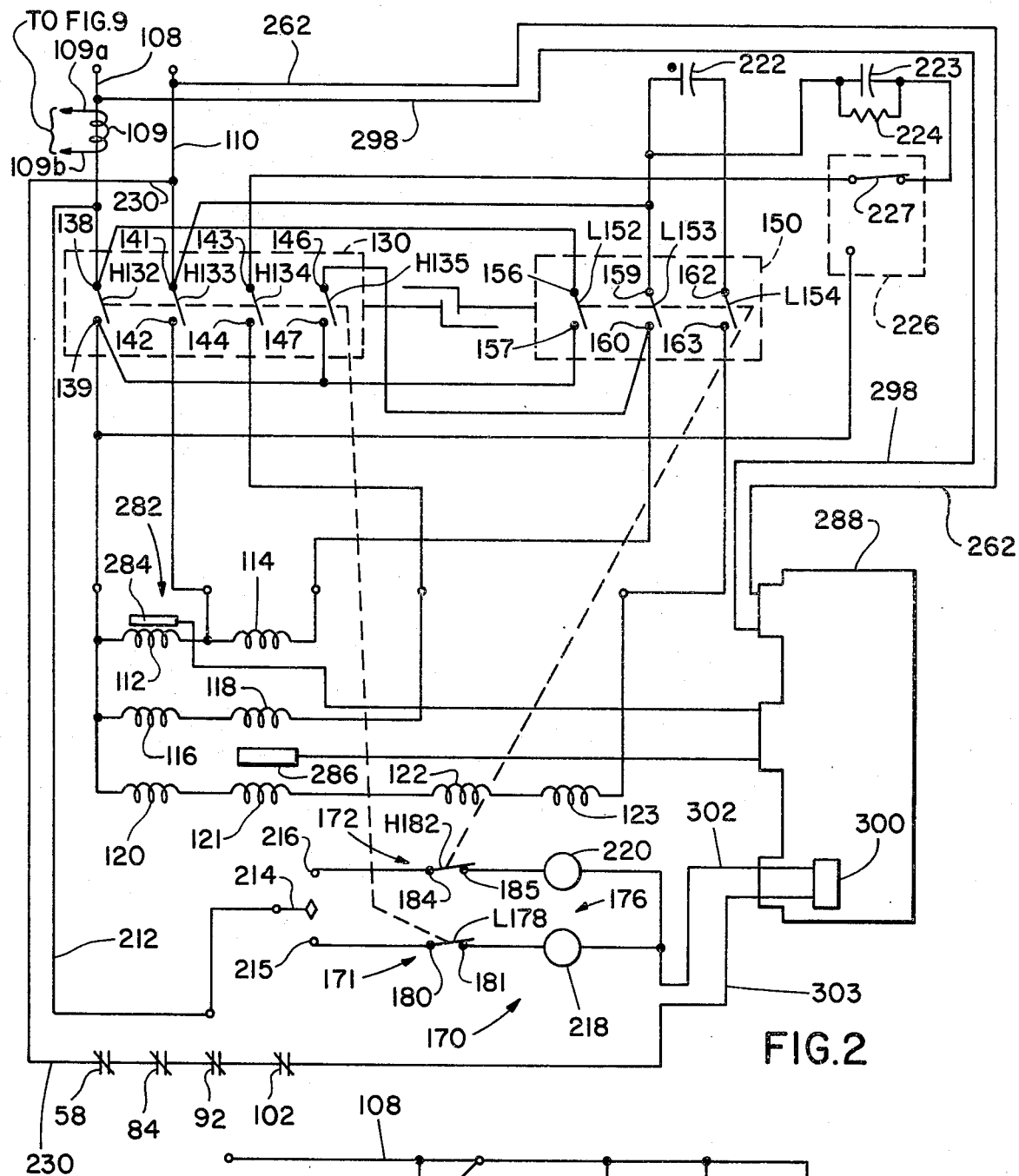
FIG. 2 is an electrical schematic diagram showing a preferred form of pilot circuit and contactor control circuit made in accordance with the present invention.

The control assembly also includes a low pressure switch assembly 90 that incorporates switch contacts 92 (Fig. 2). The switch contacts are connected in the motor pilot circuit as shown in FIG. 2.

Control assembly 72 further comprises a discharge gas temperature sensor 100 which is the same type of device as sensor 50 described above. Sensor 100 includes a set of switch contacts 102 (FIG. 2) which are connected to the sensor by conductors 104 and 105. The discharge gas temperature sensor senses discharge gas temperature at its source so as to terminate compressor motor operation if the disicharge gas temperature exceeds a predetermined high value (on the order of 300°F) to prevent breakdown of the compressor oil and damage to the running parts of the compression mechanism.

In operation, each of the switches 58, 84, 92 and 102 shown in FIG. 2 must be in a closed circuit condition in order for motor 32 to be operated. If the temperature of the running parts of the compression assembly, for example, the drive shaft, piston, rods, and wrist pin, is too low, thermal density sensor 50 opens switch contacts 58, thereby preventing motor 32 from starting up and damaging the compression mechanism. If high pressure switch assembly 82 detects pressure above approximately 410 PSIG in discharge lines 48, switch contacts 84 are open circuited or opened to stop motor 32. Likewise, if a temperature above approximately 300°F in the discharge manifold is detected by discharge gas temperature sensor 100, switch contacts 102 are opened to stop motor 32. In a similar fashion, if low pressure switch assembly 90 detects pressure below approximately 25 PSIG inside outer casing 11, switch contacts 92 are opened in order to stop motor 32.

Figure 3:
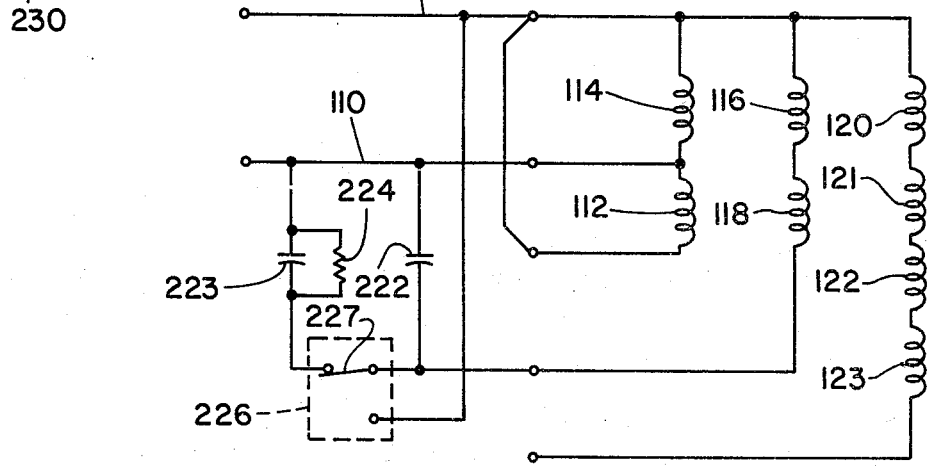
FIG. 3 is a fragmentary electrical schematic diagram showing the manner in which the windings shown in FIG. 2 are interconnected for high speed operation.

Referring to FIGS. 1 and 3, single phase electrical power is supplied to windings 36 through a shielded cable 106 over conductors 108 and 110. windings 36 comprise run windings 112 and 114, 2-pole start windings 116 and 118, and 4-pole start windings 120–123. A current transformer 109 supplies a voltage across output conductors 109A, 109B having an amplitude proportional to the current flowing through conductor 108.

In order to operate motor 32 at the high speed, a high speed contactor 130 is provided. As shown in FIG. 2, the contactor includes switch arms H 132 – H 135 that movably operate between terminal pairs 138, 139; 141, 142; 143, 144 and 146, 147, respectively.

Referring to FIG. 2, a low speed contactor 150 is used to operate motor 32 at low speed. The contactor comprises switch arms L 152 – L 154, respectively.

Each of the above described switch arms H 132 – H 135 and L 152 – L 154 is normally open in the manner shown in FIG. 2.

Control assembly 72 also includes a pilot control circuit 170 that has a low speed branch 171 for operating motor 32 at low speed and a high speed branch 172 for operating motor 32 at high speed.

Within pilot control circuit 170 is included an electrical interlock assembly 176. Referring to FIG. 2, the electrical interlock assembly comprises a normally-closed low-speed interlock switch arm L 178 that is movably operated between terminals 180 and 181. A normally closed high-speed interlock switch arm H 182 is movably operated between terminals 184 and 185. As indicated in FIG. 2, switch arm H 182 is physically ganged to low-speed contactor switch arms L 152 – L 154. Likewise, switch arm L 178 is physically ganged to high speed contactor switch arms H 132 – H 135.

Figure 6:
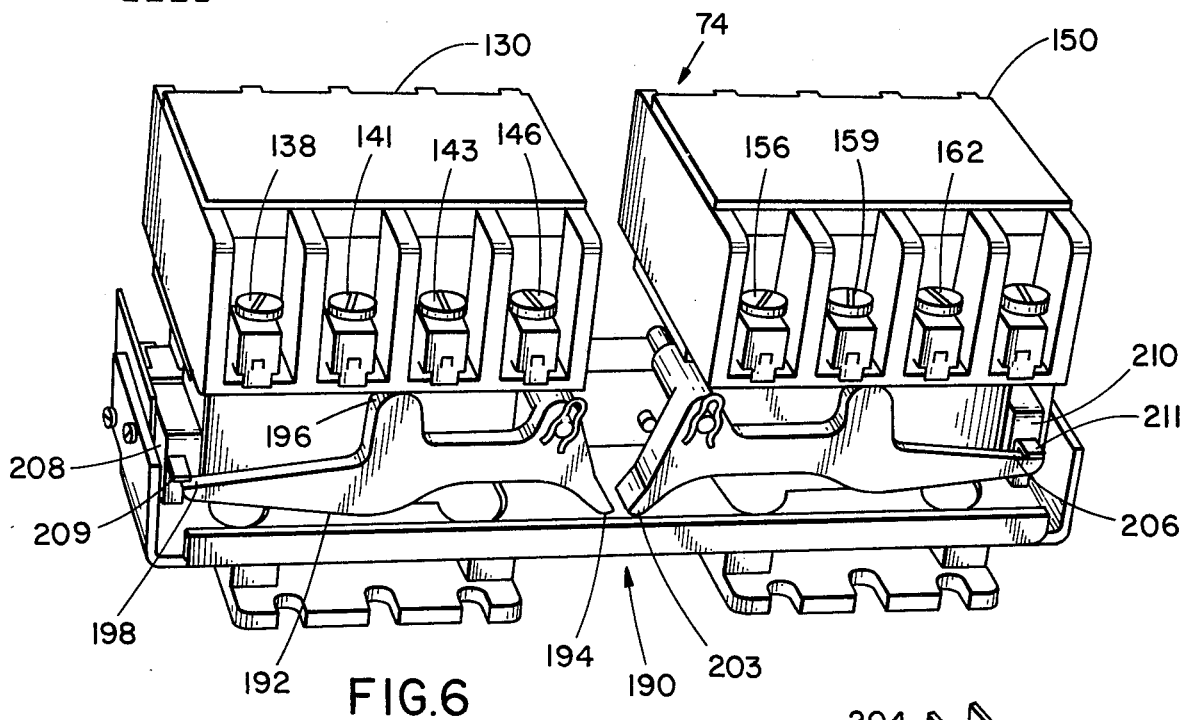
FIG. 6 is an isometric view of a preferred form of contactor made in accordance with the present invention.
Figure 7:
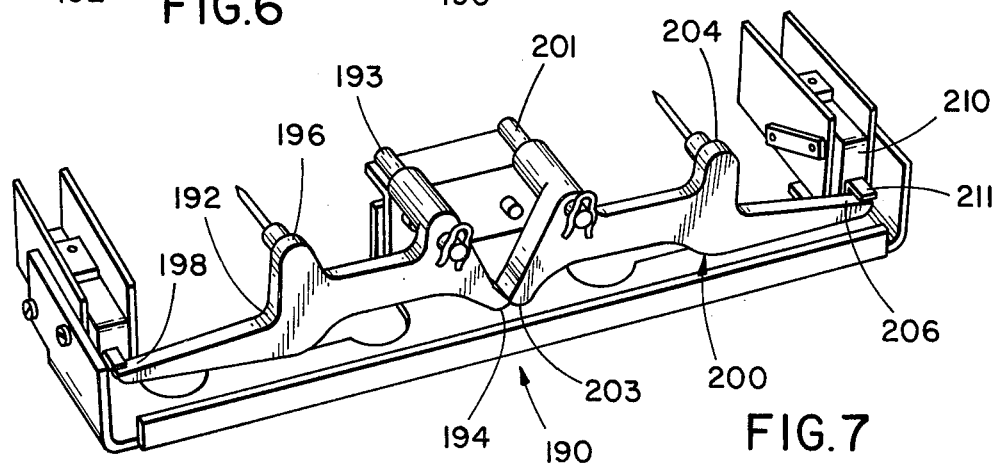
FIG. 7 is a fragmentary, isometric view of the interlock assembly of the contactor shown in FIG. 6.
Figure 8:
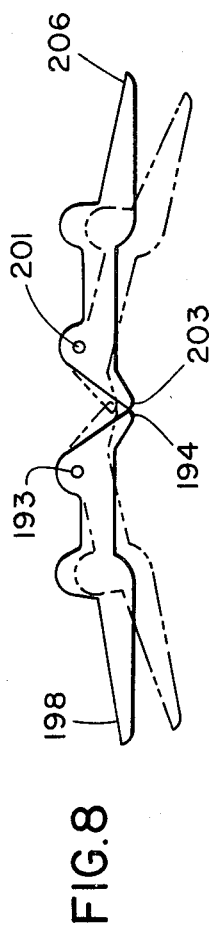
FIG. 8 is a schematic view of the interlock assembly shown in FIG. 7.

Referring to FIGS. 6–8, interlocking of the contactors is also achieved by a mechanical interlock assembly 190. Assembly 190 includes a high-speed pivot arm 192 rotatably mounted around a shaft 193. Arm 192 includes an interlock lip 194, a stop surface 196 and an operating lip 198. The assembly also includes a low-speed pivot arm 200 rotatably mounted around a shaft 201. Arm 200 includes an interlock lip 103, a stop surface 204 and an operating lip 206. As high-speed switch arms H 132 – H 153 are closed, an internal plunger (not shown) lowers bar 208 and lip 109 so that arm 192 is moved from the position shown in solid lines in FIG. 8 to the position shown in phantom. Lip 194 then prevents switch arms L 152 – 154 from closing. If switch arms L 152 – L 154 initially close, an internal plunger (not shown) lowers bar 210 and lip 211 so that arm 200 is moved from the position shown in solid lines in FIG. 8 to the position shown in phantom. In this position, lip 203 prevents switch arms H 132 – H 135 from closing.

Referring to FIG. 2, the pilot control circuit also includes a conductor 212 which conducts AC current to a speed switch arm 214 that is movable between a low speed terminal 215 and a high speed terminal 216.

The low speed branch of the circuit includes a low speed relay coil 218, and the high speed branch of the circuit includes a high speed relay coil 220 connected as shown.

The control circuit also includes a run capacitor 222, a start capacitor 223 and a resistor 224. A conventional start relay 226 includes normally closed contacts 227 which are opened after the motor is started.

In order to operate the control assembly, conductors 108 and 110 are connected to a single phase source of AC voltage, and speed switch arm 214 is moved to the desired speed terminal. Assuming switch arm 214 is placed in contact with high speed terminal 216 and that current is conducted through return conductor 230 by switch contacts 58, 84, 92 and 102, the normally closed switch arm H 182 conducts current through relay coil 220. As soon as relay coil 220 is energized, switch arms H 132 – H 135 are closed, interlock switch arm L 178 is opened, and bar 208 moves downward. As bar 208 moves downward, interlock finger 194 moves to the position shown in phantom (FIG. 8), thereby physically preventing low speed bar 210 from closing low speed switch arms L 152 – L 154. In addition, the opening of switch arm L 178 electrically prevents the energization of low speed relay coil 218.

As soon as switch arms H 132 – H 135 are closed, single phase Ac power is applied to high speed start windings 116, 118. The interconnections made by the energization of relay coil 220 is shown in FIG. 3. As soon as these connections are made, the motor begins to turn at its high speed rate.

Figure 4:
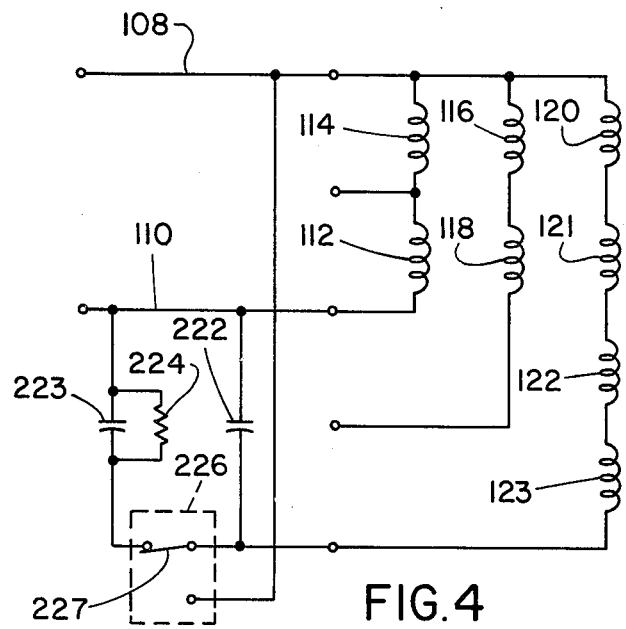
FIG. 4 is a fragmentary electrical schematic diagram showing the manner in which the windings shown in FIG. 2 are interconnected for low speed operation.

Assuming that speed switch arm 214 is moved into contact with low speed terminal 215, current passes through the normally closed switch arm L 178 in order to energize low speed relay coil 218. The energization of relay coil 218 causes bar 210 to move downward (as seen in FIG. 6) so that low speed switch arms L 152 – L 154 are closed and high speed interlock switch arm H 182 is opened. At the same time, interlock finger 203 moves to the position shown in phantom (FIG. 8) to prevent interlock finger 194 from allowing bar 208 to lower, thereby preventing switch arms H 132 – 135 from closing. As a result, relay coil 220 is physically prevented from being energized. In addition, the opening of switch arm H 182 electrically prevents the relay coil from being energized. As soon as the low speed switch arms in low speed contactor 140 are closed, the connections shown in FIG. 4 are completed so that motor 32 rotates at its low rate of speed.

Figure 5:
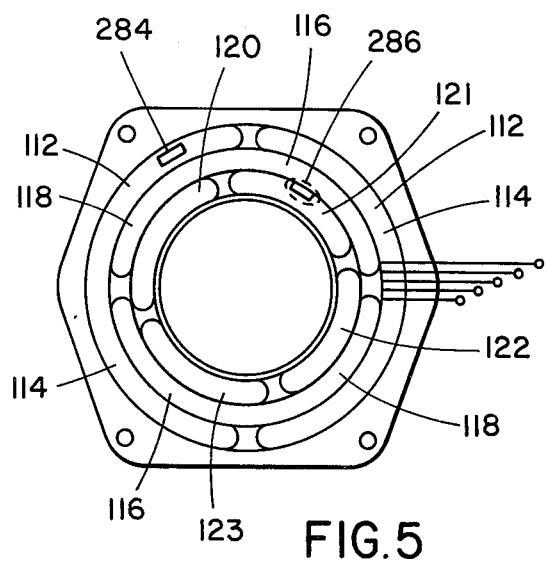
FIG. 5 is a fragmentary, cross-sectional view of the motor protection windings and sensors illustrated in FIG. 2.

Referring to FIGS. 2 and 5, windings 36 are protected from excessive temperatures by a motor protection assembly 282. The assembly includes sensors 284, 286 that are preferably embedded in windings 112, and between windings 118, 121, respectively. If the sensors cannot be embedded in these windings they may be placed adjacent the windings, but in definite thermal contact. In one motor construction, there is no insulation between the windings and the sensor could be disposed between the windings. The sensors have a positive or negative temperature coefficient of resistance so that, as the windings heat up, the resistance of the sensors changes. The resistance change with temperture may be linear or non-linear.

The sensors are used to provide temperature information for a solid state motor protection module 288. The motor protection module may be a solid state device, such as a Robert Shaw model MP23 "Statorstat Motor Protector". This device is shown in more detail in FIG. 9.

Module 288 includes a bridge resistor 290 that is used as one leg of a bridge, the other leg comprising the sensors 284, 286. The sensor resistors and bridge resistor are wired together in a bridge configuration which controls an OR gate 292. If the reference point 293 at the junction between the bridge resistor and the sensors is negative, a current flow through OR circuit 292 to energize a semiconductor relay circuit 294. Power is supplied to the relay circuit through a transformer 296 and single phase power conductor 262 and 298. Relay circuit 294 controls a triac 300 that is connected to the pilot circuit over conductors 302 and 303. Relay circuit 294 also controls a differential switch 304 and a differential resistor 306 that can be switched into the bridge circuit.

During normal running conditions, the resistance of sensors 284, 286 is lower than the resistance of bridge resistor 290. In this case, the bridge is unbalanced and reference point 293 is positive so that no current flows through OR circuit 292. Under these conditions, relay circuit 294 is energized so that triac 300 is switched to its conductive state. In its conductive state, triac 300 enables current flow through conductor 303 in the pilot circuit so that relay coils 218 and 220 may be energized. When relay circuit 294 is energized, differential switch 304 is closed and differential resistor 306 is shorted out of the bridge circuit comprising sensors 284, 286 and bridge resistor 290.

As the stator coils heat up, sensors 284, 286 also heat up and their resistance increases. If the sensor resistance exceeds the module cut out value, the bridge becomes balanced so that reference point 293 is switched to a negative polarity and current flows through OR circuit 292 in order to de-energize semiconductor relay circuit 294. As soon as relay circuit 294 is de-energized, triac 300 is switched to its nonconductive state so that current can no longer flow through conductor 303. As a result, the pilot control circuit returns contactors 130 and 150 to their open circuit condition so that the motor is turned off. At the same time that relay circuit 294 is de-energized, differential switch 304 opens so that differential resistor 306 is connected in series with sensors 284, 286. This increases the unbalance of the bridge so that OR circuit 292 prevents current from flowing to relay circuit 294 until the resistance in the sensors drops below the cut in value.

As soon as the windings have cooled, the sensor temperature and resistance drop in value until the combined resistance of sensors 284, 286 and differential resistor 306 is less than the resistance of bridge resistor 290. At this point in time, the bridge circuit is unbalanced in the opposite direction so that the polarity of junction 293 is again switched positive. As a result, OR circuit 292 conducts current, relay circuit 294 is energized and triac 300 again is switched to its conductive state. At this point in time, motor 32 again begins to rotate.

Figure 9:
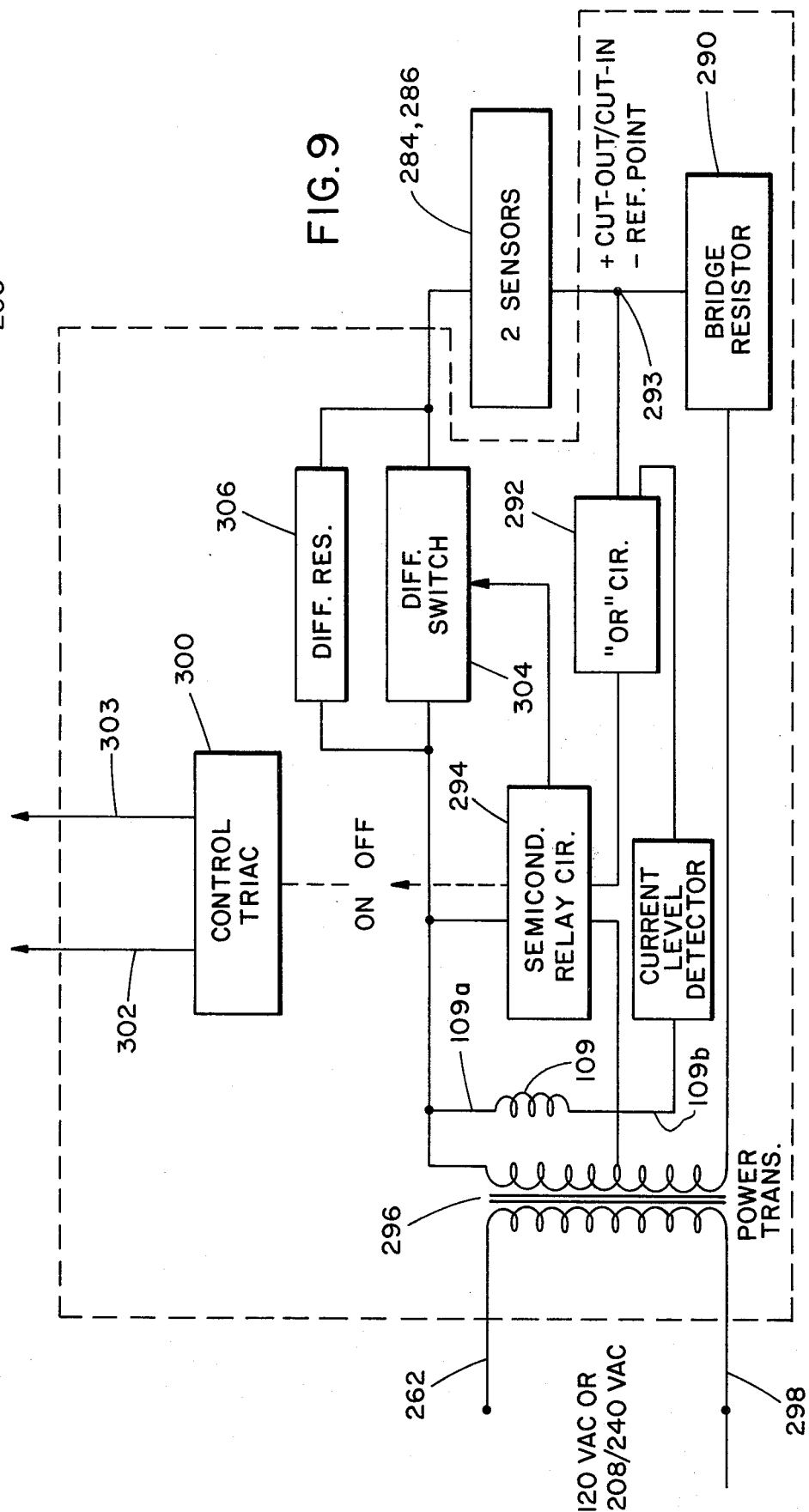
FIG. 9 is an electrical schematic block diagram of the motor protection module illustrated in FIG. 2.

As shown in FIG. 9, current transformer 109 also is connected to module 288. More specifically, conductor 109B provides an input for a conventional current level detector 310 which detects the level of current in conductor 108 by detecting the voltage across transformer 109. In a well-known manner, detector 310 produces a negative polarity signal if the current flowing through conductor 108 exceeds a predetermined safe level. As explained above, a negative polarity signal causes current to flow through OR circuit 292 so that the motor is turned off. If the current flowing through conductor 108 is below the predetermined safe level, detector 310 produces a positive polarity signal which allows the motor to operate. Current level detector 310 may incorporate a time delay feature to prevent undesirable rapid cycling.

Those skilled in the art will recognize that only a preferred embodiment has been described herein and that the embodiment may be modified and altered without departing from the true spirit and scope of the invention as defined in the accompanying claims. For example, additional current transformers could be connected in series with individual motor windings. A switch also could be added which would signal detector 310 to detect the current levels or the difference in current levels between high and low speed operation.

What is claimed is:

1. In a refrigerant compressor of the type having a compression mechanism for receiving refrigerant gas from a suction line, compressing the refrigerant gas and discharging the compressed refrigerant gas through a discharge line, and a motor for rotating drive shaft means in the compression mechanism at low speed and at high speed, said motor including run windings, low-speed start windings and high-speed start windings, improved apparatus for controlling the operation of the motor from a single phase source of electrical power comprising:
   low speed switch means for applying power from the source to the run windings and the low speed start windings to achieve low speed operation;
   high speed switch means for applying power from the source to the run windings and the high speed start windings to achieved high speed operation;
   a control circuit including a first branch for controlling the high speed witch means and a second branch for controlling the low speed switch means;
   electrical interlock means in the control circuit for preventing the simultaneous operation of the low speed switch means and the high speed switch means;
   mechanical interlock means to prevent the simultaneous operation of the low speed switch means and the high speed switch means; and
   motor protection means for interrupting the flow of current to said winding in response to a stator coil temperature greater than a predetermined value, said motor portection means comprising sensor means for indicating a change in temperature of the low or high speed start windings; and
   control means for interrupting the flow of current in the first and second branches in response to an indication from the sensor means that the temperature in the low or high start windings exceeds a predetermined value, so that the control circuit is prevented from operating the low speed switch means or the high speed switch means.

2. In a refrigerant compressor of the type having a compression mechanism for receiving refrigerant gas from a suction line, compressing the refrigerant gas and discharging the compressed refrigerant gas through a discharge line, and a motor for rotating drive shaft means in the compression mechanism at low speed and at high speed, said motor including run windings, low-speed start windings, and high-speed start windings, improved apparatus for controlling the operation of the motor from a single phase source of electrical power comprising:
   low speed switch means for applying power from the source to the run windings and the low speed start windings to achieve low speed operation;
   high speed switch means for applying power from the source to the run windings and the high speed start windings to achieve high speed operation;
   a control circuit including a first branch for controlling the high speed switch means and a second branch for controlling the low speed switch means;
   electrical interlock means in the control circuit for preventing the simultaneous operation of the low speed switch means and the high speed switch means;
   mechanical interlock means to prevent the simultaneous operation of the low speed switch means and the high speed switch means;
   the control circuit and the electrical interlock means comprising:
   high speed relay coil means connected in series with the first branch of the control circuit for operating the high speed switch means in response to the flow of current in the first branch;
   low speed relay coil means connected in series with the second branch of the control circuit for operating the low speed switch means in response to the flow of current in the second branch;
   normally-closed low speed contacts connected in series with the high speed relay coil means, said contacts being opened by the operation of the low speed switch means; and
   normally-closed high speed contacts connected in series with the low speed relay coil means, said high speed contacts being opened by the operation of the high speed switch means.

3. Apparatus, as claimed in claim 2, wherein the control circuit further comprises motor protection means for interrupting the flow of current to said winding in response to a stator coil temperature greater than a predetermined value.

4. Apparatus, as claimed in claim 3, wherein the motor protection means comprise:
   first sensor means located adjacent the run windings indicating a change in temperature of the run windings;
   second sensor means located adjacent the low and high speed start windings for indicating a change in temperature of the low or high speed start windings; and
   control means for interrupting the flow of current in the first and second branches in response to an indication from any of said sensor means that the temperature of any of said winding exceeds a predetermined value, so that the control circuit is prevented from operating the low speed switch means or the high speed switch means.

5. Apparatus, as claimed in claim 4, wherein the control means comprises:
   a bridge resistor;
   means for connecting the bridge resistor and the first and second sensor means in a bridge circuit configuration to form a junction between the bridge resistor and one of the sensor means;
   bias means for biasing the bridge configuration so that the junction has a first polarity when the windings are below a predetermined temperature and the junction has a second polarity when the windings are above a predetermined temperature;

a motor protection switch connected in series with the first and second branches; and means for opening the motor protection switch in response to the second polarity of said junction.

6. Apparatus, as claimed in claim 5, wherein the means for opening comprises means for opening the motor protection switch in response to a detection signal and wherein the apparatus further comprises:

current sensing means for sensing the current conducted to the motor windings;

detector means coupled to the current sensing means for generating the detection signal in response to a flow of current to the motor windings exceeding a predetermined value; and means for conducting the detection signal to the means for opening so that the motor windings are protected from excessive currents and temperatures.

7. In a refrigerant compressor of the type having a compression mechanism for receiving refrigerant gas from a suction line, compressing the refrigerant gas and discharging the compressed refrigerant gas through a discharge line, and a motor for rotating shaft means in the compression mechanism at low speed and at high speed, said motor including run windings, low speed start windings and high speed start windings adapted to receive single phase electrical power, improved control apparatus for protecting the windings comprising:

first sensor means located in heat exchange relationship with the run windings for indicating a change in temperature of the run windings;

second sensor means located between and in heat exchange relationship with the low speed and high speed windings for indicating a change in temperature of the low speed or high speed start windings, there being no insulation in a region between a portion of the low speed and high speed start windings and said second sensor means being in such uninsulated region; and control means for interrupting the flow of current to all said windings in response to an indication from any of said sensor means that the temperature of any of said windings exceeds a predetermined value.

8. In a refrigerant compressor of the type having a compression mechanism for receiving reefrigerant gas from a scution line, compressing the refrigerant gas and discharging the compressed refrigerant gas through a discharge line, and a motor for rotating shaft means in the compression mechanism at low speed and at high speed, said motor including run windings, low speed start windings and high speed start windings adapted to receive single phase electrical power, improved control apparatus for protecting the windings comprising:

first sensor means located adjacent the run windings for indicating a change in temperature of the run windings;

second sensor means located adjacent the low speed and high speed start windings for indicating a change in temperature of the low speed or high speed start windings;

control means for interrupting the flow of current to all said windings in response to an indication from any of said sensor means that the temperature of any of said windings exceeds a predetermined value;

said control means comprising:

a bridge resistor;

means for connecting the bridge resistor and the first and second sensor means in a bridge circuit configuration to form a junction between the bridge resistor and one of the sensor means;

bias means for biasing the bridge configuration so that the junction has a first polarity when the windings are below a predetermined temperature and the junction has a second polarity when the windings are above a predetermined temperature; and means for interrupting the flow of current to the windings in response to the second polarity of said junction.

9. Apparatus, as claimed in claim 8, wherein the means for interrupting comprises means for interrupting the flow of current to the windings in response to a detection signal and wherein the apparatus further comprises:

current sensing means for sensing the current conducted to the motor windings;

detection means coupled to the current sensing means for generating the detection signal in response to a flow of current to the motor windings exceeding a predetermined value; and means for conducting the detection signal to the means for interrupting so that the motor windings are protected from excessive currents and temperatures.

10. Apparatus, as claimed in claim 1, including sensor means located adjacent the run windings indicating a change in temperature of the run windings and wherein the control means will interrupt the flow of current in the first and second branches in response to an indication from any of said sensor means that the temperature of any of said windings exceeds a predetermined value.

* * * * *